Patented Aug. 4, 1931

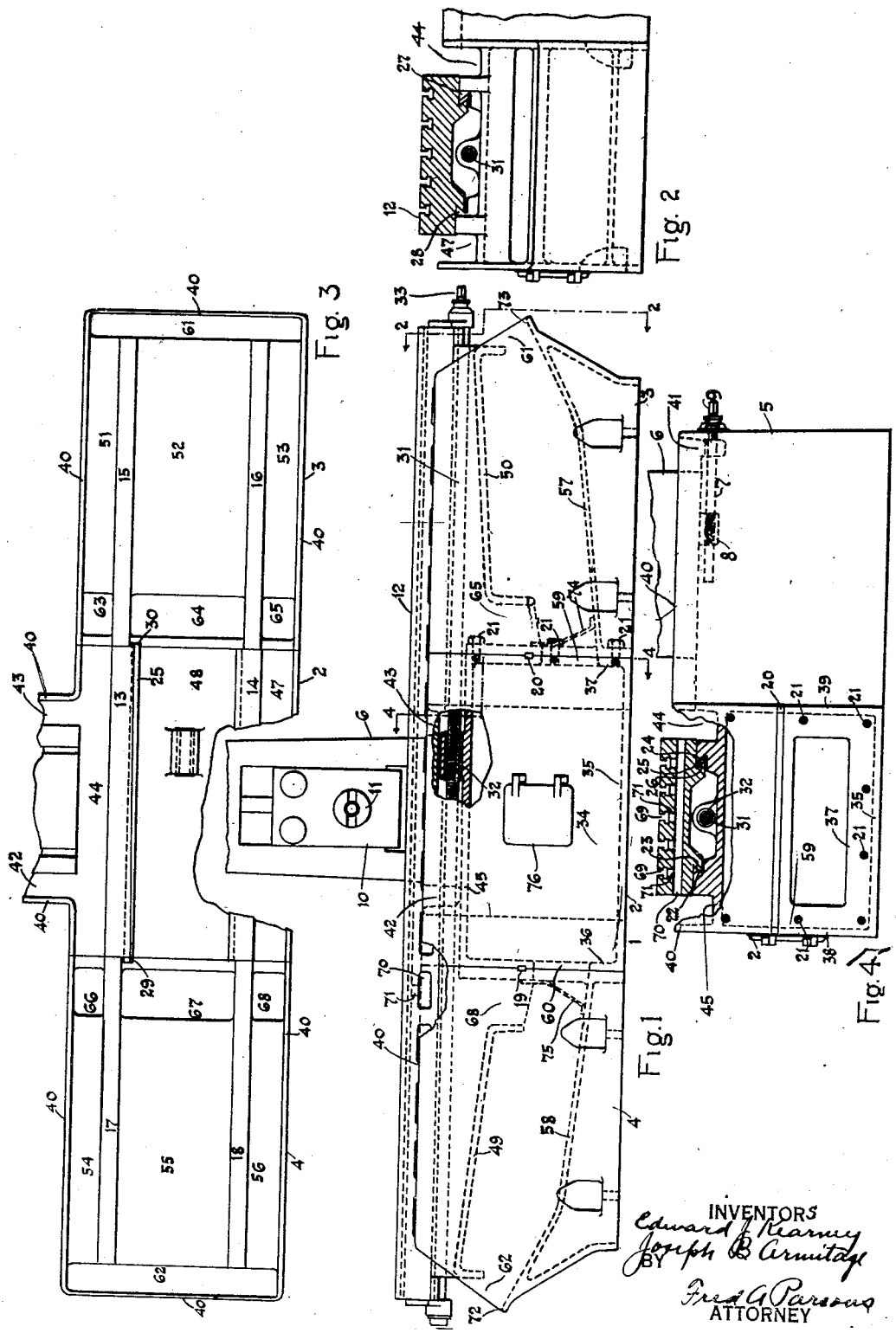

1,817,083

UNITED STATES PATENT OFFICE

EDWARD J. KEARNEY AND JOSEPH B. ARMITAGE, OF WAUWATOSA, WISCONSIN, ASSIGNORS TO KEARNEY & TRECKER CORPORATION, OF WEST ALLIS, WISCONSIN, A CORPORATION OF WISCONSIN

MACHINE TOOL

Application filed November 30, 1928. Serial No. 322,797.

This invention relates to milling machines, and more particularly to the structure or form of various supports thereof.

A purpose of the invention is to provide an improved base structure for milling machines which is capable of a substitution of supporting units for proportioning the length of support to correspond with different lengths of movable tables.

Another purpose relates to supports adapted to drain fluid from the table surface to a reservoir in the base of the machine in an improved manner.

Another purpose is to provide a simplified and improved form of milling machine base having a central support portion and end portions, the end portions being adapted to supplement certain functions of the central portion, but to eliminate other functions, whereby the end portions are particularly adapted to be interchanged to correspond with different lengths of tables, or to suit different floor space requirements for a particular machine.

Another purpose is generally to simplify and to improve the construction and operation of milling machine supports, and still other objects will be apparent from this specification.

The invention consists of the particular arrangement and combination of parts herein illustrated, described and claimed together with such modification of the structure illustrated as may be equivalent to the structure claimed.

In the drawings, similar reference characters have been applied to the same parts in each of the views, of which:

Fig. 1 is a partial front view of a milling machine incorporating the invention, certain well known portions which are not a part of this invention being omitted.

Fig. 2 is a partial end elevation of the same machine viewed from the line 2—2 of Fig. 1.

Fig. 3 is a partial top view of the machine with certain parts shown in Fig. 1 omitted.

Fig. 4 is a partial sectional elevation along line 4—4 of Fig. 1.

The machine includes a base or main support generally denoted by the numeral 1, Fig. 1, and having a central portion 2 and end portions 3—4 removably and interchangeably fixed with the central portion.

The central portion 2 is extended rearwardly at 5 to provide a support for a head or support 6, guides being provided of any suitable well known form for the adjustment of head 6 to right or left in Fig. 4, the means for such adjustment including a screw 7 rotatably journaled in bed 1, but prevented from axial movement relative thereto, and engaging a nut portion 8 fixed with head 6, the screw having a squared end portion 9 to which a crank, not shown, may be applied for rotating the screw to move head 6.

Head 6 supports a carrier or support 10 for vertical adjustment, there being a tool spindle or support 11 journaled in the carrier.

A table or work support 12 is slidably guided on bed 1, for movement transverse to the movement both of carrier 10 and of head 6, whereby the several supports together provide movement of table 12 relative to spindle 11 in three relatively transverse paths. The table guide surfaces include top surfaces 13—14 on bed portion 2, top surfaces 15—16 on bed portion 3, and top surfaces 17—18 on bed portion 4, the end portions 3—4 being removably fixed in a position to bring surfaces 15—16 and 17—18 into a common plane including surfaces 13—14, by the means of key 19 mutually engaging bed portions 2—4, key 20, mutually engaging bed portions 2—3, and removable bolts such as 21. The table is laterally guided only from the central bed portion 2, there being in such portion an angular surface 22, Fig. 4, adapted to engage a complementary surface 23 on the table, and an angular surface 24 adapted to retain a gib 25, Figs. 3—4, providing adjustment in any suitable well known manner against the angular table surface 26. In the end portions 3—4, the lateral guide surfaces for table 12 are cut away to provide clearance similar to the clearance shown in Fig. 2 at 27—28, and gib 25, although it may if desired extend somewhat outside the bed portion 2, as shown at 29 and 30, Fig. 3, is not supported in the end portions 3—4.

Table 12 may be traversed by the means of a screw 31, journaled to be restrained to move with the table and engaging a nut 32 fixed with the central bed portion 2, the screw having a squared end portion 33 adapted for a suitable crank, not shown, for rotating the screw.

Operation of a milling machine frequently requires a continuous flow of fluid over the cutters and work. Means for such fluid flow are well known and are therefore not shown. Such fluid flows continuously over the top of the table in considerable quantities and is preferably returned by the means of suitable channels to a reservoir at a lower level in the machine to be used again. A reservoir 34 suitable for such purpose is incorporated in the central base portion 2, consisting of bottom wall 35, Figs. 1–4, end walls 36—37, and side, front and rear walls 38—39. The entire upper portion of the machine is surrounded by a rim or flange 40, Fig. 3, and the base is provided with suitable channels for returning the fluid restrained by such rim or flange to the central reservoir 34. In the rear base portion 5 such channels consist of a rear channel 41, Fig. 4, leading into two side channels 42—43, Figs. 1–3, which empty into a channel 44 in the rear of the bed portion 2. In the central bed portion 2 there is an upper wall 45, Figs. 1 and 4, which together with rim 40 and other portions, forms the rear channel 44 and a front channel 46. In the end portions 3—4 there are upper walls 49—50, Fig. 1, which together with rim 40 and other portions form channels 51—52—53 for portion 3 and 54—55—56 for portion 4. The end portions 3—4 are provided with bottom walls 57—58 respectively, at a level above the fluid level of reservoir 34 and each adapted to return fluid to the reservoir through openings 59—60 extended through the adjacent walls of the center and end portions. The upper walls 49—50 of the end portions are formed to provide end openings 61—62 and intermediate openings 63—64—65 and 66—67—68, such openings being adapted to return fluid from any of the channels previously mentioned to the lower walls 57—58 of the end base portions and thence to reservoir 34.

Table 12 is of such length that ordinarily fluid flowing thereon in the vicinity of a cutter associated with spindle 11 will flow off the table into some of the various channels before it travels to an end of the table which may extend outside the rim 40. An exception is fluid which may be trapped in table T slots such as 69, Fig. 4, and thereby be prevented from flowing off the sides of the table. Such fluid is drained from the bottom of the T slots at various intermediate points in the length of the table, and passed to the sides of the table to flow into one of the adjacent channels. For this purpose there are provided transverse openings or channels such as opening 70, Figs. 1–4, which are intermediate between the bottom of the table T slots and the bottom of the table, and openings or channels such as 71 extend from the bottom of the T slots into the channels 70.

For exceptional or unusual conditions, it is contemplated that extension pans, not shown, may be removably attached to either or both ends of the bed 1, the rim 40 being dropped at points 72—73, Fig. 1, to a lower level in part in order that such extension pans may drain within the rim to return their fluid to the reservoir.

The returning fluid may carry with it a certain amount of the metal chips or cuttings. To separate such chips from the fluid, screen or filter elements 74—75, Fig. 1, are fixed in the base portions 3—4 to extend entirely across or over the openings 59—60. Chips which collect in the end portions 3—4 may be readily removed by the means of a suitable scoop or rake, not shown, passed through the openings 61—62. For cleaning the reservoir 34, a door or suitable openings 76 is provided, to permit access thereto through the front wall.

What is claimed is:

1. In a milling machine, the combination of a reciprocable table and a support for establishing the path of table movement, said support including a central section and a plurality of separately formed end sections each joined with said central section respectively at opposite ends thereof to be spaced apart thereby in the direction of travel of said table, said center section providing guide surfaces resisting table movement in a plurality of mutually transverse directions, and said end sections providing surface portions resisting table movement in one only of said directions, said table being extended longitudinally to simultaneously engage guide surfaces on each of said sections.

2. In a milling machine the combination of a reciprocable table and a bed, said bed comprising a center section and a plurality of end sections each separably joined with said center section along surfaces transverse to the movement of said table and respectively at opposite ends thereof, a cutter head associated with said center section, the section last mentioned providing a reservoir for fluid, each of said end sections providing channels for guiding fluid into said reservoir, each of said sections providing surfaces cooperating for guiding said table, said table being extended longitudinally to simultaneously engage guide surfaces on each of said sections.

3. In a milling machine the combination of a reciprocable table, a support for said table including a center section having a tool spindle supported therefrom and drive mechanism for said table and spindle also supported therefrom, a fluid reservoir associated with said center section, said support also including a plurality of separately formed end sections respectively fixed at opposite ends of said center section and spaced apart thereby in the direction of table travel, said center section providing guide surfaces resisting table movement in a plurality of mutually transverse directions, said end sections each providing guide surfaces resisting table movement in one only of said directions and also providing channels for guiding fluid into said reservoir, said table being longitudinally extended to simultaneously engage guide surfaces on each of said sections.

In witness whereof we have affixed our signatures.

EDWARD J. KEARNEY.
JOSEPH B. ARMITAGE.